US012771576B2

(12) United States Patent
Won et al.

(10) Patent No.: US 12,771,576 B2
(45) Date of Patent: Oct. 20, 2026

(54) EQUIPMENT CONFIGURED TO COMPENSATE FOR INTERFERENCE AND NOISE AND OPERATING METHOD THEREOF

(71) Applicant: SAMSUNG ELECTRONICS CO., LTD., Suwon-si (KR)

(72) Inventors: Kyunghoon Won, Suwon-si (KR); Jinho Kim, Suwon-si (KR); Hyunseung Joo, Suwon-si (KR); Huiwon Je, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 18/819,490

(22) Filed: Aug. 29, 2024

(65) Prior Publication Data

US 2025/0080380 A1 Mar. 6, 2025

(30) Foreign Application Priority Data

Aug. 29, 2023 (KR) ........................ 10-2023-0113742

(51) Int. Cl.

*H04L 25/02* (2006.01)
*H04L 5/00* (2006.01)
*H04W 72/541* (2023.01)

(52) U.S. Cl.

CPC ........ *H04L 25/0204* (2013.01); *H04L 5/0048* (2013.01); *H04W 72/541* (2023.01)

(58) Field of Classification Search

CPC .......... H04B 1/00; H04B 7/06; H04B 17/309; H04B 17/336; H04B 17/345;

(Continued)

(56) References Cited

U.S. PATENT DOCUMENTS 7,912,113 B2 3/2011 Sayana et al.
8,233,865 B2 7/2012 Hosokawa et al.

(Continued)

FOREIGN PATENT DOCUMENTS

KR 10-1017865 B1 3/2011
WO 2022/139870 A1 6/2022

OTHER PUBLICATIONS

Communication dated Jan. 20, 2025, issued by the European Patent Office in European Application No. 24195932.9.

(Continued)

*Primary Examiner* — Shawkat M Ali
(74) *Attorney, Agent, or Firm* — Sughrue Mion, PLLC

(57) ABSTRACT

A user equipment includes a transceiver configured to receive a demodulated reference signal (DMRS) having a predetermined pattern and a downlink signal including data from a base station, and a processor configured to generate estimated interference and noise by estimating interference and noise of a first channel of the DMRS corresponding to first tabs, based on temporary channel estimates corresponding to the DMRS and first channel estimation weights of the first tabs corresponding to a first minimum mean square error (MMSE) scheme, and generate compensated interference and noise by compensating for the estimated interference and noise, based on at least one of the first channel estimation weights.

20 Claims, 10 Drawing Sheets

(58) Field of Classification Search
CPC . H04B 17/346; H04J 1/00; H04J 11/00; H04J 11/005; H04J 11/0056; H04L 1/00; H04L 5/00; H04L 5/0048; H04L 25/02; H04L 25/0204; H04L 25/0224; H04L 25/0256; H04L 27/26; H04L 27/30; H04W 24/00; H04W 24/02; H04W 24/08; H04W 40/00; H04W 56/00; H04W 72/08; H04W 72/541
USPC ......... 370/318, 328, 342–343, 441; 375/141, 375/219, 260, 262, 267, 295, 316, 346
See application file for complete search history.

(56) References Cited

U.S. PATENT DOCUMENTS

| | | | | |
|---|---|---|---|---|
| 8,687,749 | B2 | 4/2014 | Serbetli | |
| 9,667,372 | B2 | 5/2017 | Ohwatari et al. | |
| 9,774,416 | B2 | 9/2017 | Ohwatari et al. | |
| 10,985,948 | B2 | 4/2021 | Hosseini et al. | |
| 2010/0220651 | A1 | 9/2010 | Chen et al. | |
| 2018/0219709 | A1* | 8/2018 | Pawar | H04L 27/2607 |
| 2022/0103321 | A1* | 3/2022 | Huss | H04L 25/0232 |
| 2022/0158870 | A1* | 5/2022 | Hewavithana | H04L 25/0256 |
| 2022/0225146 | A1* | 7/2022 | Yoo | H04W 24/10 |
| 2023/0155864 | A1* | 5/2023 | Abdoli | H04L 25/0204 370/329 |

OTHER PUBLICATIONS

Savaux et al., "An Iterative and Joint Estimation of SNR and Frequency Selective Channel for OFDM Systems", ResearchGate, 2012 (8 pages total).
Van De Beek et al., "On Channel Estimation in OFDM Systems", 1995 IEEE 45th Vehicular Technology Conference, Countdown to the Wireless Twenty-First Century, 1995, pp. 1-5 (6 pages total).
"LTE; Evolved Universal Terrestrial Radio Access (E-UTRA); Relay radio transmission and reception", 3GPP TS 36.116 version 17.0.0 Release 17, ETSI TS 136 116 V17.0.0, 2022, pp. 1-35 (36 pages total).
"LTE; Evolved Universal Terrestrial Radio Access (E-UTRA); Physical channels and modulation", 3GPP TS 36.211 version 17.3.0 Release 17, ETSI TS 136 211 V17.3.0, 2023, pp. 1-247 (248 pages total).
"5G; NR; Physical channels and modulation", 3GPP TS 38.211 version 17.4.0 Release 17, ETSI TS 138 211 V17.4.0, 2023, pp. 1-140 (141 pages total).
"5G; NR; Physical channels and modulation", 3GPP TS 38.211 version 17.5.0 Release 17, ETSI TS 138 211 V17.5.0, 2023, pp. 1-140 (141 pages total).

* cited by examiner

EQUIPMENT CONFIGURED TO COMPENSATE FOR INTERFERENCE AND NOISE AND OPERATING METHOD THEREOF

CROSS-REFERENCE TO RELATED APPLICATION

This application is based on and claims priority under 35 U.S.C. § 119 to Korean Patent Application No. 10-2023-0113742, filed on Aug. 29, 2023, in the Korean Intellectual Property Office, the disclosure of which is incorporated by reference herein in its entirety.

BACKGROUND

This application is related to wireless communication, and more particularly, to a user equipment configured to compensate for interference and noise of a received signal and an operating method of the user equipment.

In recent years, as wired/wireless communication technology and smart device-related technology have developed rapidly, there is an increasing need for more accurate estimation of interference and noise to enable stable communication between a user equipment, an external device, and/or a base station in a wireless communication system.

A demodulation reference signal (DMRS), which is a reference signal transmitted through a downlink according to some transmission modes of a 3GPP NR and long-term evolution (LTE), has been introduced for the demodulation of a received signal, which includes channel estimation, interference removal, and synchronization. The user equipment may use a DMRS received through a wireless communication channel for a linear minimum mean square error (LMMSE)-based channel estimation and equalization method, the removal of interference from a received signal, and a signal-to-noise ratio (SNR) estimation. However, when the channel estimation and the SNR estimation are performed by using the DMRS, there is a problem that the inference and noise of a signal may be distorted according to a channel environment (e.g., a measured SNR, a Doppler frequency, and delay spread). Therefore, to accurately estimate the channel and SNR of the signal received by the user equipment, a method of compensating for the distortion of the interference and noise of the signal is required.

SUMMARY

Embodiments provide a user equipment and an operating method thereof, which may generate compensated interference and noise by compensating for estimated interference and noise in a wireless communication system.

Embodiments also provide a user equipment and an operating method thereof, which may correct an estimated channel and a received signal, based on compensated interference and noise.

The technical objectives of the embodiments are not limited to the above disclosure; other objectives may become apparent to those of ordinary skill in the art based on the following descriptions.

Provided herein is a user equipment including a transceiver configured to receive a demodulation reference signal (DMRS) having a predetermined pattern and a first downlink signal including data from a base station; and a processor configured to generate an estimated interference and noise by estimating interference and noise of a first channel using the DMRS and using a first minimum mean square error (MMSE) scheme, based on temporary channel estimates corresponding to the DMRS and first channel estimation weights corresponding to the first MMSE scheme, and generate compensated interference and noise by compensating for the estimated interference and noise, based on at least one of the first channel estimation weights.

Also provided herein is a method of a user equipment, the method including: receiving a demodulation reference signal (DMRS) having a predetermined pattern and a downlink signal including data from a base station; generating an estimated interference and noise by estimating interference and noise of a first channel using the DMRS and using a frequency-minimum mean square error (MMSE) scheme and a time-MMSE scheme, based on temporary channel estimates corresponding to the DMRS, first channel estimation weights corresponding to the frequency-MMSE scheme, and second channel estimation weights corresponding to the time-MMSE scheme; and generating compensated interference and noise by compensating for the estimated interference and noise, based on at least one of the first channel estimation weights and at least one of the second channel estimation weights.

Also provided herein is a user equipment including a transceiver configured to receive a demodulation reference signal (DMRS) having a predetermined pattern and a downlink signal including data from a base station; and a processor configured to generate an estimate of a first channel by estimating the first channel using the DMRS and using a frequency-minimum mean square error (MMSE) scheme and a time-MMSE scheme, based on temporary channel estimates corresponding to the DMRS, first channel estimation weights corresponding to the frequency-MMSE scheme, and second channel estimation weights corresponding to the time-MMSE scheme, generate estimated interference and noise by estimating interference and noise corresponding to the first channel, based on the estimate of the first channel, and generate compensated interference and noise by compensating for the estimated interference and noise, based on at least one of the first channel estimation weights and at least one of the second channel estimation weights, wherein the compensated interference and noise are greater than the estimated interference and noise.

BRIEF DESCRIPTION OF DRAWINGS

Embodiments will be more clearly understood from the following detailed description taken in conjunction with the accompanying drawings in which.

DETAILED DESCRIPTION OF EMBODIMENTS

Figure 1:
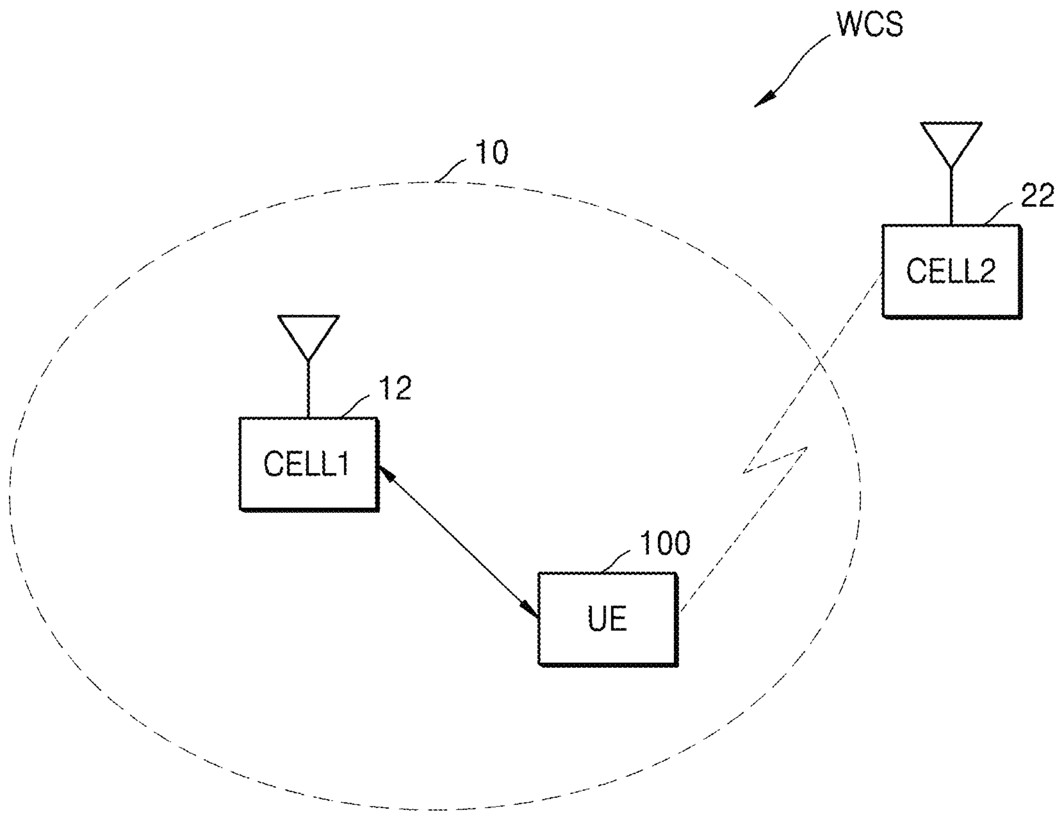
FIG. 1 is a block diagram of a wireless communication system according to an embodiment.

FIG. 1 is a block diagram of a wireless communication system according to an embodiment.

Hereinafter, embodiments are described based on a new-radio (NR) network-based wireless communication system (WCS), but embodiments are not limited to an NR network. Embodiments may be applied to other wireless communication systems with similar technical backgrounds or channel settings (e.g., cellular communication systems, such as long-term evolution (LTE), LTE-advanced (LTE-A), wireless broadband (WiBro), and global system for mobile communication (GSM), or near-field communication (NFC) systems, such as Bluetooth and NFC.

In addition, various functions described below may be implemented or supported by artificial intelligence (AI) technology or at least one computer program. Each of the at least one computer program may include computer-readable program code and be executed on a computer-readable medium. The terms "application" and "program" refer to at least one computer program, software components, instruction sets, procedures, functions, objects, classes, instances, associated data, or a portion thereof adapted for implementation in suitable computer-readable program code. The term "computer-readable program code" refers to all types of computer code, which include source code, object code, and executable code. The term "computer-readable medium" refers to all types of media that may be accessed by a computer, for example, read-only memory (ROM), random access memory (RAM), a hard disk drive (HDD), a compact disk (CD), a digital video disk (DVD), or any other type of memory. A "non-transitory" computer-readable medium may exclude wired, wireless, optical, or other communication links that transmit transient electrical or other signals. The non-transitory computer-readable medium may include a medium on which data may be permanently stored and a medium on which data may be stored and overwritten later, such as a rewritable optical disk or an erasable memory device.

In embodiments described below, a hardware approach method is described as an example. However, embodiments include a technique using both hardware and software, and thus, the embodiments do not exclude a software approach method.

Referring to FIG. 1, a wireless communication system WCS may include a first cell 12, a user equipment (UE) 100, and a second cell 22. Each of the first cell 12 and the second cell 22 may generally refer to a fixed station, which communicates with the UE 100 and/or another cell (not shown). Each of the first cell 12 and the second cell 22 may exchange data and control information by communicating with the UE 100 and/or the other cell (not shown). For example, each of the first cell 12 and the second cell 22 may be referred to as a base station, a Node B, an evolved-Node B (eNB), a next generation Node B (gNB), a sector, a site, a base transceiver system (BTS), an access point (AP), a relay node, a remote radio head (RRH), a radio unit (RU), a small cell, a device, or the like.

The UE 100 may refer to any device that may be fixed or mobile and may transmit and receive data and/or control information to/from any one of the first cell 12 and the second cell 22 by communicating with any one of the first cell 12 and the second cell 22. For example, the UE 100 may be referred to as a terminal, a terminal equipment, a mobile station (MS), a mobile terminal (MT), a user terminal (UT), a subscribe station (SS), a wireless communication device, a wireless device, or a handheld device.

The first cell 12 may provide wireless broadband access to the UE 100 within a coverage 10 of the first cell 12. As used herein, the first cell 12 that communicates with the UE 100 may be referred to as a serving cell. The second cell 22 may be a cell adjacent to the UE 100 and may be referred to as a neighbor cell. The UE 100 may receive undesired interference from the second cell 22. As used herein, the second cell 22 may be referred to as an interference cell for the UE 100. As used herein, embodiments assume that the UE 100 has one interference cell 22, but embodiments are not limited thereto. It will be fully understood that the embodiments may be applied even when there are a plurality of interference cells.

The UE 100 may receive a demodulation reference signal (DMRS) having a predetermined pattern and a downlink signal including data from the first cell 12. For example, the UE 100 may receive the DMRS having the predetermined pattern and data from the first cell 12 through a physical downlink shared channel (PDSCH).

The downlink signal received by the UE 100 from the first cell 12 may be interfered with by a signal transmitted by the second cell 22. Also, the downlink signal received by the UE 100 from the first cell 12 may include noise caused by obstacles located in a path of a channel between the UE 100 and the first cell 12. Accordingly, the downlink signal received by the UE 100 may include interference and noise.

The UE 100 may estimate a first channel corresponding to the DMRS, based on temporary channel estimates corresponding to the DMRS having the predetermined pattern and channel estimation weights, estimate an estimate (or referred to as a DMRS channel estimate) of the first channel and/or a second channel of data, and generate a channel estimate (or referred to as a data channel estimate). As used herein, for brevity, a channel corresponding to the DMRS will be referred to as the first channel, and a channel corresponding to data will be referred to as the second channel. However, such terms are used only for the purpose of distinguishing one channel from another channel, and the embodiments are not limited thereto. The UE 100 may generate estimated interference and noise corresponding to any one of the temporary channel estimates, based on the temporary channel estimates corresponding to the DMRS and the channel estimation weights. However, the estimated interference and noise may be underestimated compared to actual interference and noise depending on a channel environment. For example, the estimated interference and noise may be estimated to be less than the actual interference and noise as a signal to noise ratio (SNR) increases.

Here, the temporary channel estimate may refer to a channel estimate corresponding to a DMRS that is estimated by using a least square (LS) scheme at a resource element (RE) position to which the DMRS is assigned. The DMRS channel estimate may refer to a channel estimate of the first channel corresponding to a DMRS that is estimated by using a minimum mean square error (MMSE) scheme, based on the temporary channel estimates and the channel estimation weights. The channel estimation weight may be determined considering an RE position corresponding to a channel to be estimated and the channel environment. The channel environment may include at least one of an SNR, a delay spread (DS), and a Doppler frequency. Although each of the DMRS channel estimate and the temporary channel estimate is an estimate of the first channel corresponding to the DMRS, because the DMRS channel estimate is a channel estimate that is estimated based on the temporary channel estimates and the channel estimation weight, the DMRS channel estimate may be a more accurate channel estimate than the temporary channel estimate.

The UE 100 may compensate for the estimated interference and noise, based on any one of the channel estimation weights used for the generation of the DMRS channel estimate. The UE 100 may compensate for the estimated interference and noise and generate compensated interference and noise. The UE 100 may correct a channel estimate for a channel of data, based on the compensated interference and noise, and generate a corrected channel estimate. Also, the UE 100 may correct a data signal corresponding to data, based on the compensated interference and noise, and generate a corrected data signal. The UE 100 may estimate an SNR and/or a signal to interference noise ratio (SINR) based on the compensated interference and noise. Methods of generating, by the UE 100, the DMRS channel estimate, the estimated interference and noise, and the compensated interference and noise, based on the temporary channel estimate and/or the channel estimation weights, are described in detail below. Similarly, a method of generating, by the UE 100, a corrected channel estimate and a corrected data signal, based on the compensated interference and noise, is described in detail below.

The UE 100 may compensate for the estimated interference and noise, based on at least one of the channel estimation weights, and thus, estimation accuracy for interference and noise may improve. As the estimation accuracy of interference and noise increases, the UE 100 may improve in terms of performance of channel estimation and various operations performed with reference to an SNR and/or an SINR. In the following descriptions, the SNR and the SINR may be interchangeably applied.

Figure 2:
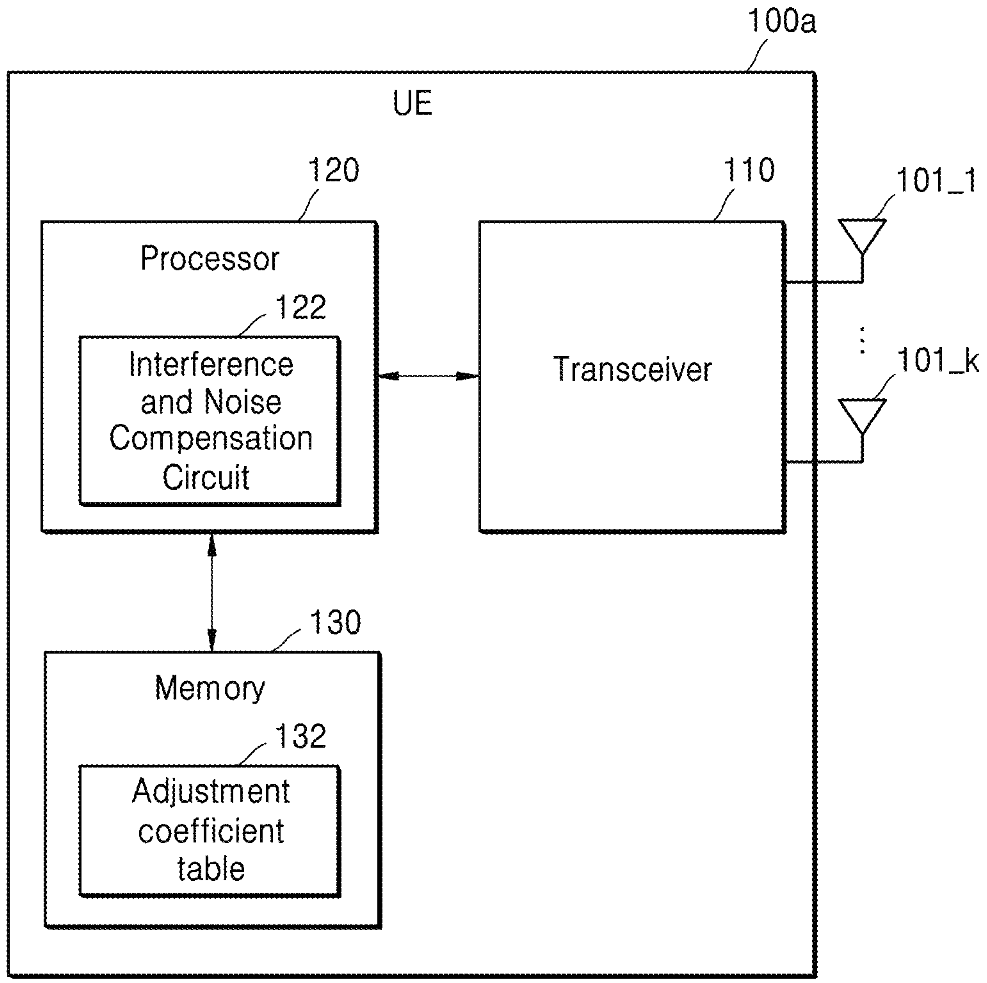
FIG. 2 is a block diagram of an embodied example of a user equipment according to an embodiment.

FIG. 2 is a block diagram of an embodied example of a UE according to an embodiment.

A UE 100*a* of FIG. 2 may correspond to the UE 100 of FIG. 1. Accordingly, the same description as that of the UE 100 given with reference to FIG. 1 is omitted.

Referring to FIG. 2, the UE 100*a* may include a plurality of antennas 101_1 to **101_*k*, a transceiver 110, a processor 120, and a memory 130**.

The transceiver 110 may receive a downlink signal transmitted by a cell through the antennas 101_1 to **101_*k*. The transceiver 110 may down-convert a frequency of the received downlink signal and generate a middle frequency or baseband signals. For example, the UE 100***a* may receive a DMRS having a predetermined pattern and a downlink signal including data through the transceiver 110.

The processor 120 may generate data signals by filtering, decoding, and digitalizing the middle frequency or the baseband signals. The processor 120 may perform a predetermined operation based on the data signals. The processor 120 may decode, multiplex, and analog-convert the generated data signals through the predetermined operation. The transceiver 110 may up-convert the middle frequency or the baseband signal output by the processor 120 and transmit an uplink signal through the antennas 101_1 to **101_*k***.

However, embodiments are not limited thereto, and the UE 100*a* may further include an additional integrated circuit (IC) (not shown) configured to perform some of the above-described operations of the processor 120.

The processor 120 according to the embodiment may receive the DMRS having the predetermined pattern and the signal including data and estimate a channel of the received signal. The processor 120 may generate temporary channel estimates corresponding to the DMRS having the predetermined pattern. The processor 120 may estimate interference and noise corresponding to one of the temporary channel estimates, based on the temporary channel estimates and first channel estimation weights of a first tab corresponding to a frequency-MMSE scheme, and generate estimated interference and noise. The processor 120 may include an interference and noise compensation circuit 122. The interference and noise compensation circuit 122 may compensate for the estimated interference and noise, based on at least one of the first channel estimation weights. The interference and noise compensation circuit 122 may compensate for the estimated interference and noise and generate compensated interference and noise.

Here, a tab may refer to an operation that is performed on a channel estimation weight corresponding to a DMRS having a predetermined pattern and a temporary channel estimate. The processor 120 may perform an operation on the temporary channel estimate and the channel estimation weight, which correspond to each other, based on tabs, and generate an estimate of a channel according to an MMSE scheme. A frequency-MMSE scheme may refer to a scheme using a temporary channel estimate corresponding to a DMRS assigned to a frequency domain and channel estimation weights. Accordingly, the first tab and the first channel estimation weights may refer to tabs and channel estimation weights corresponding to the frequency domain. Similarly, a time-MMSE scheme may refer to a scheme using temporary channel estimates corresponding to a DMRS assigned to a time domain and channel estimation weights. Details of the temporary channel estimates corresponding to the DMRS and the channel estimation weights are described below with reference to FIG. 5.

In another embodiment, the processor 120 may estimate a first channel of the DMRS corresponding to first tabs and second tabs, based on the temporary channel estimates corresponding to the DMRS, the first channel estimation weights of the first tabs corresponding to the frequency-MMSE scheme, and second channel estimation weights of the second tabs corresponding to the time-MMSE scheme, generate an estimate of the first channel, and estimate interference and noise, based on the estimate of the first channel. The processor 120 may estimate interference and noise of the first channel of the DMRS and generate estimated interference and noise. The interference and noise compensation circuit 122 may compensate for the estimated interference and noise, based on at least one of the first channel estimation weights and at least one of the second channel estimation weights. The interference and noise compensation circuit 122 may compensate for the estimated interference and noise and generate compensated interference and noise.

Hereinafter, operations of the interference and noise compensation circuit 122 may be interpreted as operations of the processor 120 and/or the UE 100*a*. Specifically, the interference and noise compensation circuit 122 may be implemented in hardware or stored in the memory 130 in the form of program code executed by the processor to perform the compensation of estimated interference and noise, according to embodiments.

The memory 130 may store an adjustment coefficient table 132. The adjustment coefficient table 132 may include an adjustment coefficient corresponding to an estimated SNR. The UE 100*a* according to another embodiment may compensate for the estimated interference and noise, based on at least one of the first channel estimation weights, at least one of the second channel estimation weights, and the adjustment coefficient corresponding to the measured SNR. For example, the UE 100*a* may determine the adjustment coefficient, based on the estimated SNR, and compensate for the estimated interference and noise, on the additional basis of the determined adjustment coefficient.

Figure 3:
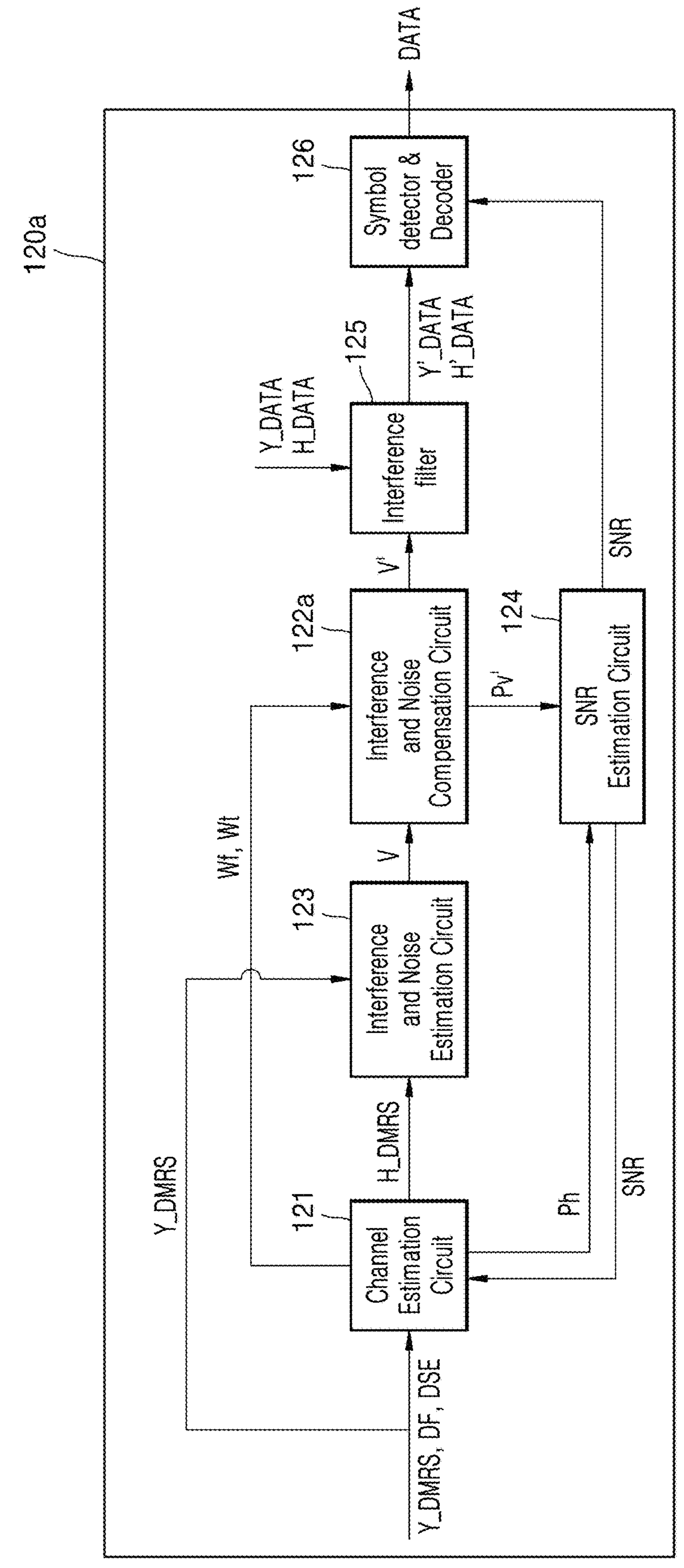
FIG. 3 is a block diagram of a processor according to an embodiment.

FIG. 3 is a block diagram of a processor 120*a* according to an embodiment.

The processor 120*a* and an interference and noise compensation circuit 122*a* of FIG. 3 may respectively correspond to the processor 120 and the interference and noise compensation circuit 122 of FIG. 2. Accordingly, the same descriptions as those of the processor 120 and the interference and noise compensation circuit 122 given with reference to FIG. 2 are omitted.

The processor 120*a* may include a channel estimation circuit 121, the interference and noise compensation circuit 122*a*, an interference and noise estimation circuit 123, an SNR estimation circuit 124, an interference filter 125, and a symbol detector & decoder 126.

The channel estimation circuit 121 may receive an estimated SNR from the SNR estimation circuit 124 and receive a DMRS Y_DMRS having a predetermined pattern from a received signal buffer (not shown). The channel estimation circuit 121 may further delay spread estimates (DSE) and a doppler frequency (DF) from a DSE & DF estimation circuit (not shown). The channel estimation circuit 121 may generate temporary channel estimates (not shown) corresponding to the DMRS Y_DMRS having the predetermined pattern. The received signal buffer may store a DMRS having a predetermined pattern and a downlink signal including data and transmit the downlink signal to other components.

For example, the channel estimation circuit 121 may generate the temporary channel estimates at a DMRS position by using an LS scheme. The channel estimation circuit 121 may generate an estimate (i.e., a DMRS channel estimate H_DMRS) of a first channel of a DMRS corresponding to first tabs, based on the temporary channel estimates (not shown) corresponding to the received DMRS (Y_DMRS) and first channel estimation weights Wf of the first tabs corresponding to a frequency-MMSE scheme. Alternatively, the channel estimation circuit 121 may generate an estimate (i.e., a DMRS channel estimate H_DMRS) of a first channel of a DMRS corresponding to first tabs and second tabs, based on the temporary channel estimates corresponding to the DMRS, first channel estimation weights Wf of the first tabs corresponding to a frequency-MMSE scheme, and second channel estimation weights Wt of the second tabs corresponding to a time-MMSE scheme.

Specifically, the channel estimation circuit 121 may determine the first channel estimation weights Wf and the second channel estimation weights Wt, based on at least one of the estimated SNR, a DF of a channel, and a DSE. For example, the channel estimation circuit 121 may determine the first channel estimation weights Wf, based on the estimated SNR and DSE, and determine the second channel estimation weights Wt, based on the estimated SNR and DF. Here, the estimated SNR may be an SNR measured based on a downlink signal previously received by a UE (refer to 100 in FIG. 1).

The channel estimation circuit 121 may generate the DMRS channel estimate H_DMRS according to Equation 1 below. Equation 1 may be understood with reference to the above descriptions.

$$\hat{h}_{k,l} = \sum_{i=0}^{N_t-1} w_{f,i,l} \dot{h}_{k-\left\lfloor \frac{N_t}{2} \right\rfloor + i, l} \quad \text{[Equation 1]}$$

wherein $\hat{h}_{k,l}$ denotes the DMRS channel estimate H_DMRS, $N_t$ denotes the number (or a tab-size) of temporary channel estimates used to estimate the DMRS channel, $\dot{h}_{k,l}$ denotes the temporary channel estimate, and $W_{f,i,l}$ denotes the first channel estimation weight (or a frequency channel estimation weight). k denotes a subcarrier index, and l denotes an orthogonal frequency division multiplexing (OFDM) symbol index. Accordingly, the channel estimation circuit 121 may generate a DMRS channel estimate H_DMRS of a DMRS channel corresponding to the first tabs, based on the first channel estimation weights of the first tabs corresponding to one of the temporary channel estimates and the temporary channel estimates. In Equation 1, although the second channel estimation weight Wt is omitted, the application of the second channel estimation weight Wt may be understood in a similar manner to the application of the first channel estimation weight Wf to channel estimation.

Although not shown in FIG. 3 for brevity, the channel estimation circuit 121 may generate a channel estimate H_DATA of a channel of data in a similar manner to the generation of the DMRS channel estimate H_DMRS. Specifically, the channel estimation circuit 121 may receive a data signal Y_DATA corresponding to data from the received signal buffer. The channel estimation circuit 121 may generate a channel estimate H_DATA corresponding to data, based on the temporary channel estimates corresponding to the DMRS and the first channel estimation weights Wf. Alternatively, the channel estimation circuit 121 may generate a channel estimate H_DATA, based on the temporary channel estimates, the first channel estimation weights Wf, and the second channel estimation weights Wt.

As described below with reference to FIG. 5, respective channels of the DMRS having the predetermined pattern and data, which are received by the UE 100, may be estimated by different tabs. That is, the UE 100 may estimate the channels of the DMRS having the predetermined pattern and the data, based on tabs corresponding respectively to the DMRS having the predetermined pattern and the data. The tabs may include channel estimation weights corresponding respectively to the temporary channel estimates. A channel estimation weight may have a greater value as a temporary channel estimate corresponding thereto is closer to a channel to be estimated. Accordingly, channel estimation weights of a tab corresponding to a channel to be estimated may be different according to a position of the channel to be estimated. More details are described below with reference to FIG. 5.

The interference and noise estimation circuit 123 may receive a DMRS Y_DMRS from the received signal buffer and receive the DMRS channel estimate H_DMRS from the channel estimation circuit 121. The interference and noise estimation circuit 123 may estimate interference and noise of the first channel of the DMRS corresponding to the first tabs, based on the received DMRS Y_DMRS and the DMRS channel estimate H_DMRS. When the DMRS channel estimate H_DMRS is generated on the additional basis of the second tabs, the interference and noise estimation circuit 123 may estimate interference and noise of the first channel of the DMRS corresponding to the first tabs and the second tabs, and generate estimated interference and noise V.

The interference and noise estimation circuit 123 may generate the estimated interference and noise V according to Equation2 below. Equation 2 may be understood with reference to the above descriptions.

$$\hat{v}_{k,l} = y_{k,l} - \hat{h}_{k,l}x_{k,l} \quad \text{[Equation 2]}$$

wherein $\hat{v}_{k,l}$ denotes the estimated interference and noise V, $\hat{h}_{k,l}$ denotes the DMRS channel estimate H_DMRS, $y_{k,l}$ denotes the received DMRS Y_DMRS, and $x_{k,l}$ denotes a DMRS that the UE 100 has determined. Because the UE 100 has determined a transmission signal at a DMRS position, the UE 100 may determine $x_{k,l}$. Accordingly, the interference and noise estimation circuit 123 may generate $\hat{v}_{k,l}$, based on $y_{k,l}$, $\hat{h}_{k,l}$ and $x_{k,l}$.

The interference and noise compensation circuit 122*a* according to the embodiment may receive the estimated interference and noise V from the interference and noise estimation circuit 123 and receive the first channel estimation weights Wf from the channel estimation circuit 121. In another embodiment, when the DMRS channel estimate H_DMRS are generated on the additional basis of the second tabs, the interference and noise compensation circuit 122*a* may further receive the second channel estimation weights Wt from the channel estimation circuit 121. The interference and noise compensation circuit 122*a* according to the embodiment may compensate for the estimated interference and noise V, based on at least one the first channel estimation weights Wf, and generate compensated interference and noise V'. In another embodiment, the interference and noise compensation circuit 122*a* may compensate for the estimated interference and noise V, based on at least one of the first channel estimation weights Wf and at least one of the second channel estimation weights Wt, and generate compensated interference and noise V'.

The interference and noise compensation circuit 122*a* may generate the compensated interference and noise V', based on Equation 3 below. Equation 3 may be understood with reference to the above descriptions. Equation 3 may be a result obtained by substituting Equation 1 into Equation 2.

$$\hat{v}_{k,l} = \left(1 - w_{f,\lfloor \frac{N_t}{2} \rfloor, l}\right) v_{k,l} + h_{k,l}x_{k,l} - w_{f,\lfloor \frac{N_t}{2} \rfloor, l} h_{k,l} x_{k,l} - \left(\sum_{i=0, i\neq \lfloor N_t/2 \rfloor}^{N_t-1} w_{f,i,l}\dot{h}_{k-\lfloor \frac{N_t}{2} \rfloor + i, l}\right) x_{k,l} \quad \text{[Equation 3]}$$

In Equation 3, $v_{k,l}$ denotes actual interference and noise. Accordingly, the estimated interference and noise $\hat{v}_{k,l}$ (refer to V in FIG. 3) may be underestimated by approximately $$\left(1 - w_{f,\lfloor \frac{N_t}{2} \rfloor, l}\right)$$

as compared to the actual interference and noise. Because the channel estimation weight is typically greater than 0 and less than 1, the estimated interference and noise V may be less than the compensated interference and noise V'.

Thus, the interference and noise compensation circuit 122*a* may compensate for the estimated interference and noise V, based on at least one of the first channel estimation weights Wf, and generate the compensated interference and noise V'.

As described above, Equation 3 may be derived through an equation from the estimated interference and noise V, which are obtained based on the first channel estimation weights Wf and the temporary channel estimates. Similarly, when the interference and noise estimation circuit 123 generates the estimated interference and noise V on the additional basis of the second channel estimation weights Wt, the estimated interference and noise V may be underestimated by approximately $$\left(1 - w_{f,\lfloor \frac{N_t}{2} \rfloor, l} w_{t,a,l}\right) v_{k,l}$$

as compared to the actual interference and noise. Accordingly, the interference and noise compensation circuit 122*a* may compensate for the estimated interference and noise V, based on at least one of the first channel estimation weights Wf and at least one of the second channel estimation weights Wt, and generate compensated interference and noise V'.

The SNR estimation circuit 124 may receive power Ph of a channel estimate (e.g., H_DMRS or H_DATA) from the channel estimation circuit 121 and receive power Pv' of interference and noise from the interference and noise compensation circuit 122*a*. The SNR estimation circuit 124 may estimate an SNR (or SINR), based on the power Ph of the channel estimate and the power Pv' of interference and noise. Here, the power Pv' of interference and noise may be power of the estimated interference and noise V or the compensated interference and noise V'. The SNR estimation circuit 124 may estimate the SNR based on the compensated interference and noise V'. Accordingly, the SNR estimation performance of the UE 100 may improve.

The interference filter 125 may receive the compensated interference and noise V' from the interference and noise compensation circuit 122*a*. Also, the interference filter 125 may receive the data signal Y_DATA and the channel estimate H_DATA of the channel of data. The interference filter 125 may generate an interference mitigation filter for the data signal Y_DATA and the channel estimate H_DATA of the channel corresponding to the data, based on the compensated interference and noise V'. The interference filter 125 may filter the data signal Y_DATA and the channel estimate H_DATA, based on the interference mitigation filter, and correct the data signal Y_DATA and the channel estimate H_DATA. The interference filter 125 may correct the data signal Y_DATA and the channel estimate H_DATA and generate a corrected data signal Y'_DATA and a corrected channel estimate H'_DATA.

The symbol detector & decoder 126 may receive the corrected data signal Y'_DATA and the corrected channel estimate H'_DATA. The symbol detector & decoder 126 may receive an estimated SNR from the SNR estimation circuit 124. The estimated SNR received by the symbol detector & decoder 126 may be an SNR, which is estimated based on the compensated interference and noise V'. The symbol detector & decoder 126 may decode and detect data, based on the corrected data signal Y'_DATA, the corrected channel estimate H'_DATA, and the estimated SNR. The symbol detector & decoder 126 may output decoded data DATA based on the corrected data signal Y'_DATA, the corrected channel estimate H'_DATA, and the estimated SNR. Accordingly, the UE 100 may improve performance of channel estimation and data detection by compensating for the estimated interference and noise V.

Figure 4:
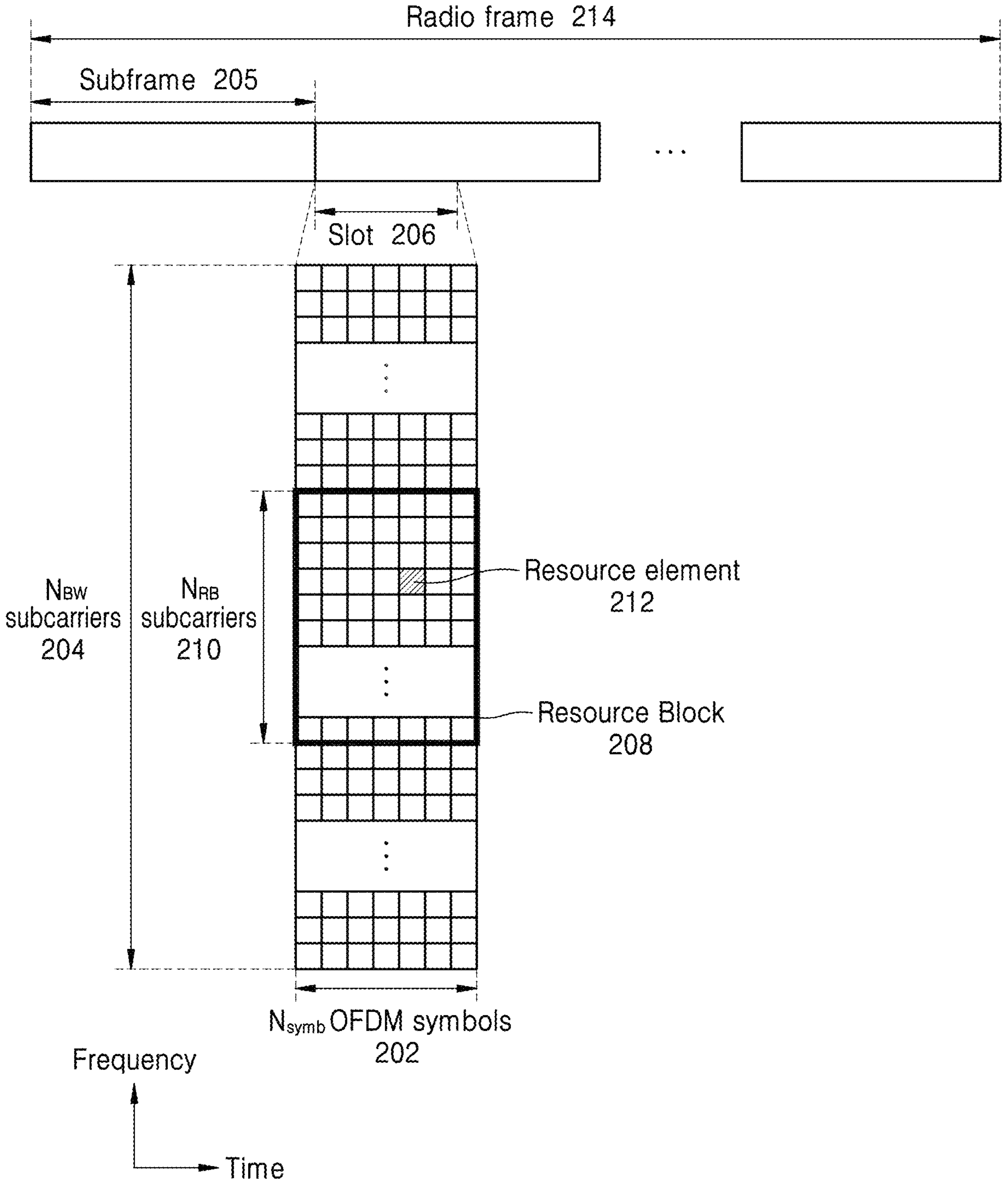
FIG. 4 is a diagram of a basic structure of a time-frequency domain, which is a wireless resource domain in a wireless communication system.

FIG. 4 is a diagram of a basic structure of a time-frequency domain, which is a wireless resource domain in a wireless communication system.

Referring to FIG. 4, an abscissa denotes a time domain, and an ordinate denotes a frequency domain. A minimum transmission unit in a time domain may be an OFDM symbol, and $N_{symb}$ (202) OFDM symbols may be gathered to constitute one slot 206. Two slots may be gathered to constitute one subframe 205. As an example, the slot 206 may have a length of 0.5 ms, and the subframe 205 may have a length of 1.0 ms. However, in other embodiments, a length of the slot 206 may be variable depending on the configuration of the slot 206, and the number of slots in the subframe 205 may vary according to the length of the slot 206. Moreover, in an NR network, the time-frequency domain may be defined centering around the slot 206. In addition, a radio frame 214 may be a unit of the time domain, which includes 10 subframes 205.

A minimum transmission unit in a frequency domain may be a subcarrier, and a bandwidth of the entire system transmission band may include a total of $N_{BW}$ (204) subcarriers. In the time-frequency domain, a basic unit of a resource may be an RE 212, which may be expressed as an OFDM symbol index and a subcarrier index. A resource block (RB) 208 may be defined as $N_{symb}$ (202) consecutive OFDM symbols in the time domain and $N_{RB}$ (210) consecutive subcarriers in the frequency domain. Thus, one RB 208 may include ($N_{symb}$*$N_{RB}$) REs 212.

Hereinafter, for brevity, it is assumed that the basic structure of the time-frequency domain described with reference to FIG. 4 is used. However, embodiments are not limited thereto.

Figure 5:
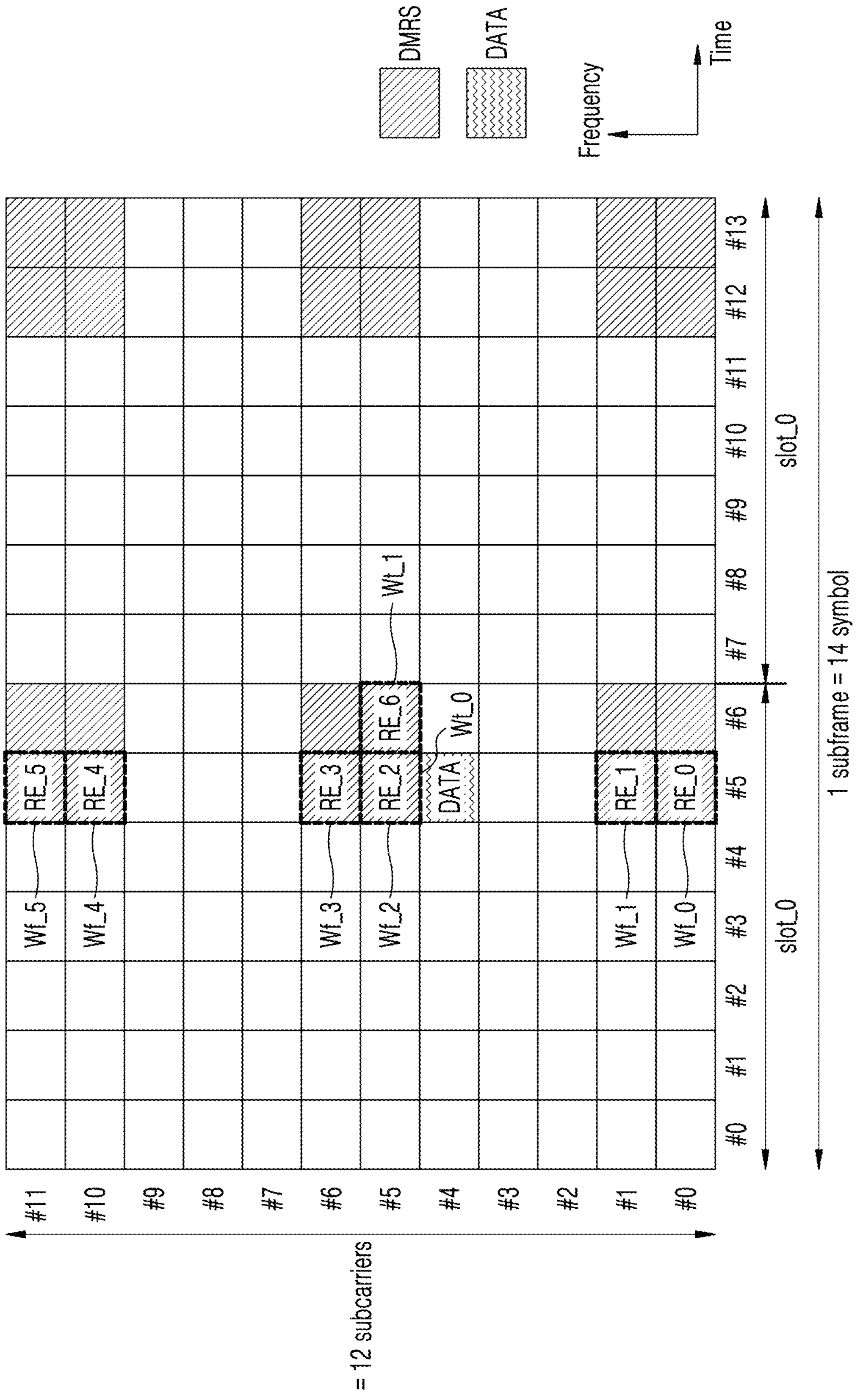
FIG. 5 is a diagram for explaining the estimation and compensation of interference and noise, based on a demodulation reference signal (DMRS), according to an embodiment.

FIG. 5 is a diagram for explaining channel estimation based on a DMRS, according to an embodiment.

Referring to FIG. 5, a UE (refer 100 in FIG. 1) may indicate a subframe configured to receive a subframe from a base station. The subframe may include two slots.

As described above, the UE 100 may receive a DMRS having a predetermined pattern and a downlink signal having data from the base station. Referring to FIG. 5, the DMRS received by the UE 100 may be located in the last two symbols of the slot. For example, the DMRS received by the UE 100 may be located in a sixth symbol, a seventh symbol, a thirteenth symbol, and a fourteenth symbol in one subframe. In addition, the DMRS may be located in a first subcarrier, a second subcarrier, a sixth subcarrier, a seventh subcarrier, an eleventh subcarrier, and a twelfth subcarrier. However, embodiments are not limited thereto, and the DMRS may have a different pattern from the pattern shown in FIG. 5. As shown in FIG. 5, an RE to which data DATA is assigned may be adjacent to an RE to which the DMRS is assigned.

Referring to FIG. 5, the UE 100 may receive a DMRS having a predetermined pattern and a downlink signal including data. The UE 100 may generate temporary channel estimates corresponding to the DMRS at a DMRS position by using an LS scheme. For example, the UE 100 may generate temporary channel estimates corresponding to the DMRS (located in a frequency domain) located in the sixth symbol. That is, the UE 100 may generate temporary channel estimates corresponding respectively to REs RE_0 to RE_5 by using an LS scheme.

The UE 100 may estimate a first channel of a DMRS corresponding to each of the temporary channel estimates, based on tabs corresponding respectively to the temporary channel estimates. As described above, the number of first tabs may be equal to the number of channels to be estimated, and the first tabs may correspond to the channel to be estimated. A tab-size may refer to the number of channel estimation weights corresponding to the tab. The tab-size may be selected at a level that may handle performance degradation of a UE, and the number of channel estimation weights may be equal to the temporary channel estimate referenced by the UE 100. The UE 100 may generate a channel estimate of the channel, based on the first tabs corresponding to the channel to be estimated and the temporary channel estimates. For brevity, the following description assumes the estimation of interference and noise and the estimation of the channel of the DMRS, which correspond to the RE RE_2. Thus, the estimation of interference and noise and the estimation of the channel of the DMRS, which correspond to the remaining REs at the DMRS position, may be understood with reference to the following description.

The UE 100 may generate channel estimates of the first channel of the DMRS corresponding to the first tabs, based on the temporary channel estimates and first channel estimation weights Wf_0 to Wf_5 of the first tab corresponding to a frequency-MMSE scheme. For example, the UE 100 may generate a DMRS channel estimate (refer to H_DMRS in FIG. 3) corresponding to the RE RE_2, based on the temporary channel estimates corresponding respectively to the REs RE_2 to RE_5 and the first channel estimation weights Wf_0 to Wf_5 of the first tabs corresponding to the RE RE_2. The first channel estimation weights Wf_0 to Wf_5 of the first tabs may each have a greater value toward the RE RE_2. For example, the first channel estimation weights Wf_2 corresponding to the RE RE_2 may have a greatest value among the first channel estimation weights Wf_0 to Wf_5. Similarly, the first channel estimation weight Wf_3 corresponding to the RE RE_3, which is closest to the RE RE_2, may have the next greatest value after the first channel estimation weight Wf_2.

The UE 100 may estimate inference and noise of the channel corresponding to the RE RE_2, based on the DMRS channel estimate H_DMRS, a received DMRS (refer to Y_DMRS in FIG. 3), and the DMRS that the UE 100 already has determined. As described above, the estimated interference and noise may be underestimated as compared to actual interference and noise, and a degree of underestimation may increase as an estimated SNR (refer to SNR in FIG. 3) increases. As described with reference to Equation 3, the degree of underestimation of interference and noise may be related to a channel estimation weight.

The UE 100 may compensate for the estimated interference and noise and generate compensated interference and noise, based on at least one of the channel estimation weights. For example, the UE 100 may compensate for the estimated interference and noise (refer to V in FIG. 3), based on the first channel estimation weight Wf_2 having the greatest value among the first channel estimation weights Wf_0 to Wf_5 and a combination (e.g., Wf_2 and Wf_3) of at least two channel estimation weights. For example, the combination of the at least two channel estimation weights may be an average of the at least two channel estimation weights. However, embodiments are not limited thereto, and the UE 100 may compensate for the estimated interference and noise by applying different weights to the at least two channel estimation weights based on a communication environment.

The UE 100 according to another embodiment may generate a DMRS channel estimate and estimated interference and noise on the additional basis of a time-MMSE scheme together with the frequency-MMSE scheme. The UE 100 may generate temporary channel estimates corresponding to the DMRS by using an LS scheme. The UE 100 may generate a DMRS channel estimate (refer to H_DMRS in FIG. 3) corresponding to the RE RE_2, based on the temporary channel estimates corresponding respectively to the REs RE_0 to RE_6, the first channel estimation weights Wf_0 to Wf_5 of the first tabs corresponding to the frequency-MMSE scheme, and second channel estimation weights Wt_0 and Wt_1 of second tabs corresponding to the time-MMSE scheme. Similar to the above descriptions, the second channel estimation weight Wt_0 corresponding to the RE RE_2 may have a greater value than the second channel estimation weight Wt_1. The UE 100 may estimate interference and noise of a channel of the RE RE_2, based on the DMRS channel estimate, the received DMRS, and the DMRS that the UE 100 already has determined. The UE 100 may compensate for the estimated interference and noise, based on at least one of the first channel estimation weights Wf_0 to Wf_5 and at least one of the second channel estimation weights Wt_0 and Wt_1, and generate compensated interference and noise. For example, the UE 100 may compensate for the estimated interference and noise, based on the first channel estimation weight Wf_2, which has the greatest value among the first channel estimation weights Wf_0 to Wf_5, and the second channel estimation weight Wt_0, which has a greatest value among the second channel estimation weights Wt_0 and Wt_1, and generate compensated interference and noise.

The UE 100 may estimate a channel corresponding to data DATA, based on the temporary channel estimates corresponding respectively to the REs RE_0 to RE_6, first channel estimation weights, and second channel estimation weights, and generate a channel estimate. Specifically, the UE 100 may estimate a second channel of data DATA, based on first channel estimation weights of first tabs corresponding to the data DATA and temporary channel estimates, and generate the channel estimate. Alternatively, the UE 100 may generate a channel estimate of the second channel on the additional basis of second channel estimation weights of second tabs corresponding to data DATA. As described above, the first channel estimation weights of the first tabs and the second channel estimation weights of the second tabs, which correspond to the data DATA, may have greater values toward the data DATA. The UE 100 may correct the channel estimate of the second channel, based on the compensated interference and noise, and generate a corrected channel estimate. For example, the UE 100 may generate an interference filter, based on the compensated interference and noise, correct the channel estimate through the interference filter, and generate a corrected channel estimate.

Although the DMRS is illustrated as being set to two symbols in one slot in FIG. 5, embodiments are not limited thereto. For example, the DMRS may be set to one symbol in one slot. When the DMRS is set in one slot, the UE 100 may compensate for the estimated interference and noise, based on at least of the channel estimation weights corresponding to the frequency-MMSE scheme.

The UE 100 may compensate for the estimated interference and noise on the additional basis of an adjustment coefficient and generate compensated interference and noise. Referring to Equation 3 described above, differences between the compensated interference and noise, which are generated by the UE 100 based on the channel estimation weight, and the actual interference and noise may increase as the channel estimation weight increases. Accordingly, the UE 100 may compensate for the estimated interference and noise, on the additional basis of the adjustment coefficient, and generate compensated interference and noise. As described above, the UE 100 may determine the channel estimation weight based on an estimated SNR. Accordingly, the adjustment coefficient may correspond to the estimated SNR. For example, the adjustment coefficient may be proportional or inversely proportional to the estimated SNR. When the UE 100 receives a signal through an extended pedestrian A (EPA) channel, the UE 100 may compensate for the estimated interference and noise, based on the adjustment coefficient that is proportional to the estimated SNR. In contrast, when the UE 100 receives a signal through an extended vehicular A (EVA) channel, the UE 100 may compensate for the estimated interference and noise, based on the adjustment coefficient, which is proportional to the estimated SNR. The UE 100 may include an adjustment coefficient table including the adjustment coefficient corresponding to the SNR. The UE 100 may determine the adjustment coefficient to be used for the compensation of the estimated interference and noise, based on the estimated SNR.

Figure 6:
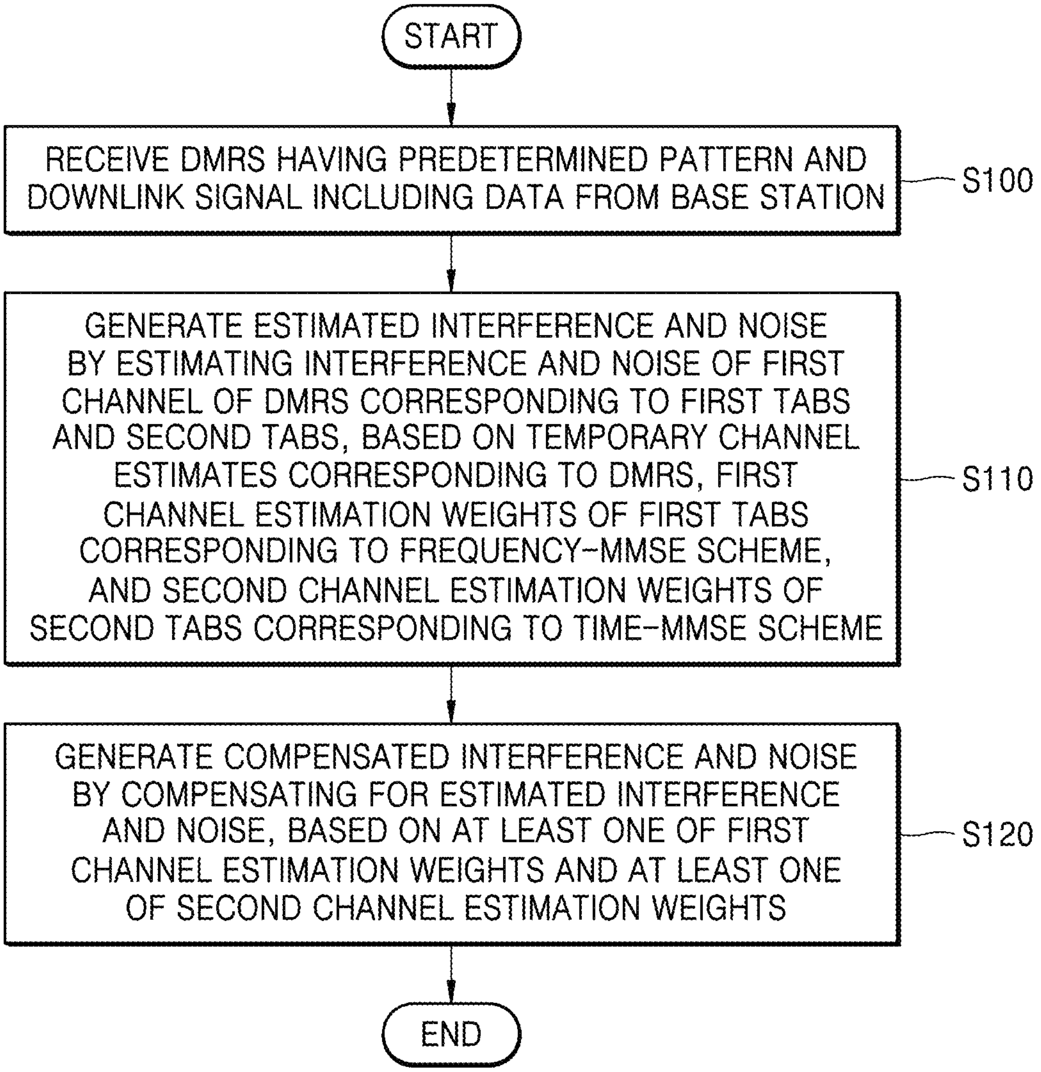
FIG. 6 is a flowchart of an operating method of a user equipment, according to an embodiment.

FIG. 6 is a flowchart of an operating method of a UE, according to an embodiment.

Referring to FIG. 6, in operation S100, a UE (refer to 100 in FIG. 1) may receive a DMRS having a predetermined pattern and a downlink signal including data from a base station.

In operation S110, the UE 100 may generate estimated interference and noise by estimating interference and noise of a first channel of a DMRS corresponding to first tabs and second tabs, based on temporary channel estimates corresponding to the DMRS, first channel estimation weights of the first tabs corresponding to a frequency-MMSE scheme, and second channel estimation weights of the second tabs corresponding to a time-MMSE scheme.

In operation S120, the UE 100 may compensate for the estimated interference and noise, based on at least one of the first channel estimation weights and at least one of the second channel estimation weights, and generate compensated interference and noise. For example, the UE 100 may generate the compensated interference and noise, based on the first channel estimation weight and the second channel estimation weight corresponding to the DMRS channel. As described above, the first channel estimation weight corresponding to the DMRS channel may have a greatest value among the first channel estimation weights, and the second channel estimation weight corresponding to the DMRS channel may have a greatest value among the second channel estimation weights.

Figure 7:
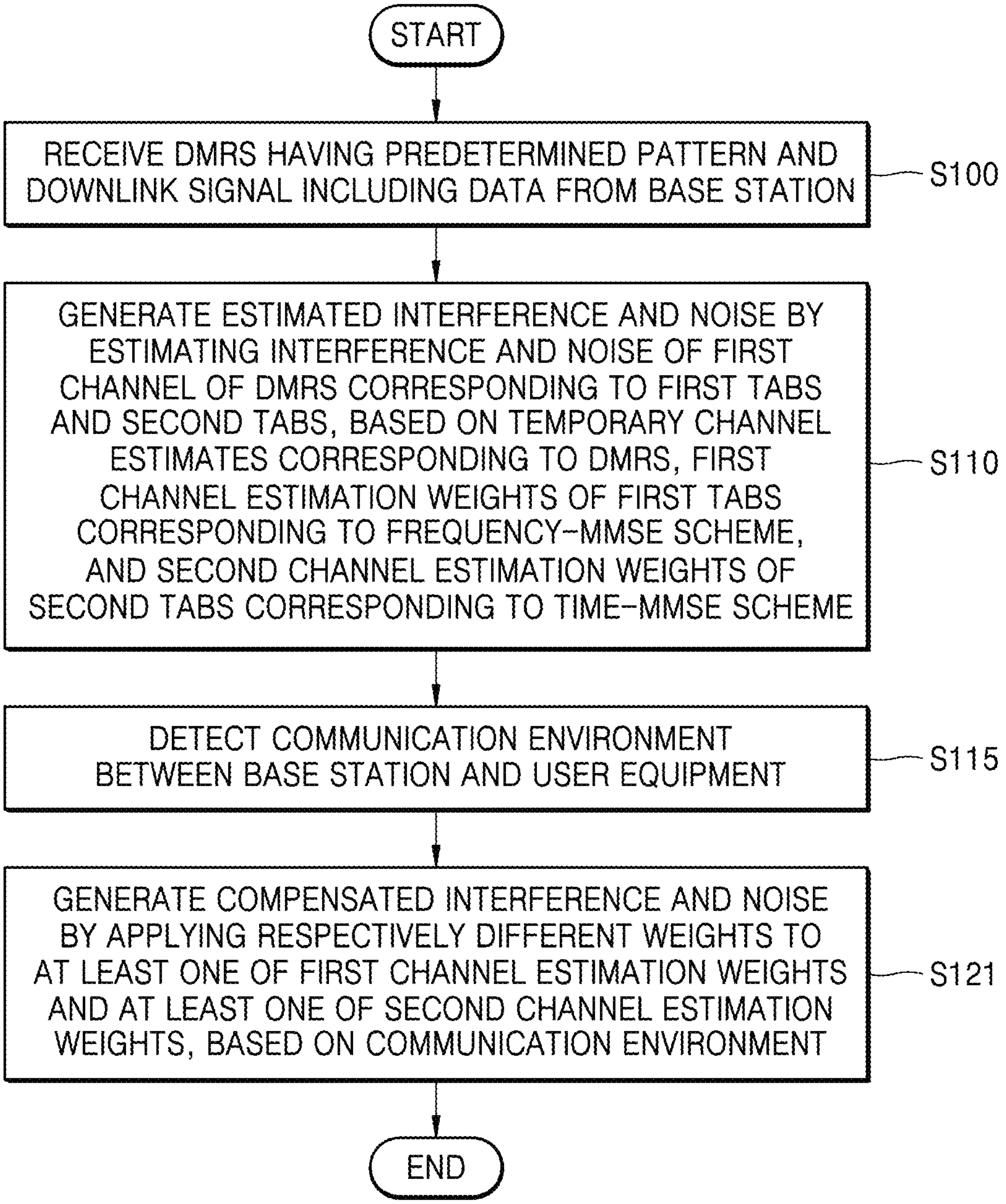
FIG. 7 is a flowchart of an operating method of a user equipment, according to an embodiment.

FIG. 7 is a flowchart of an operating method of a UE, according to an embodiment.

Operation S100 and operation S110 of FIG. 7 are the same as those given with reference to FIG. 6, and thus, detailed descriptions thereof are omitted. Hereinafter, operation S115 and operation S121 are mainly described with reference to FIG. 7.

Figure 8:
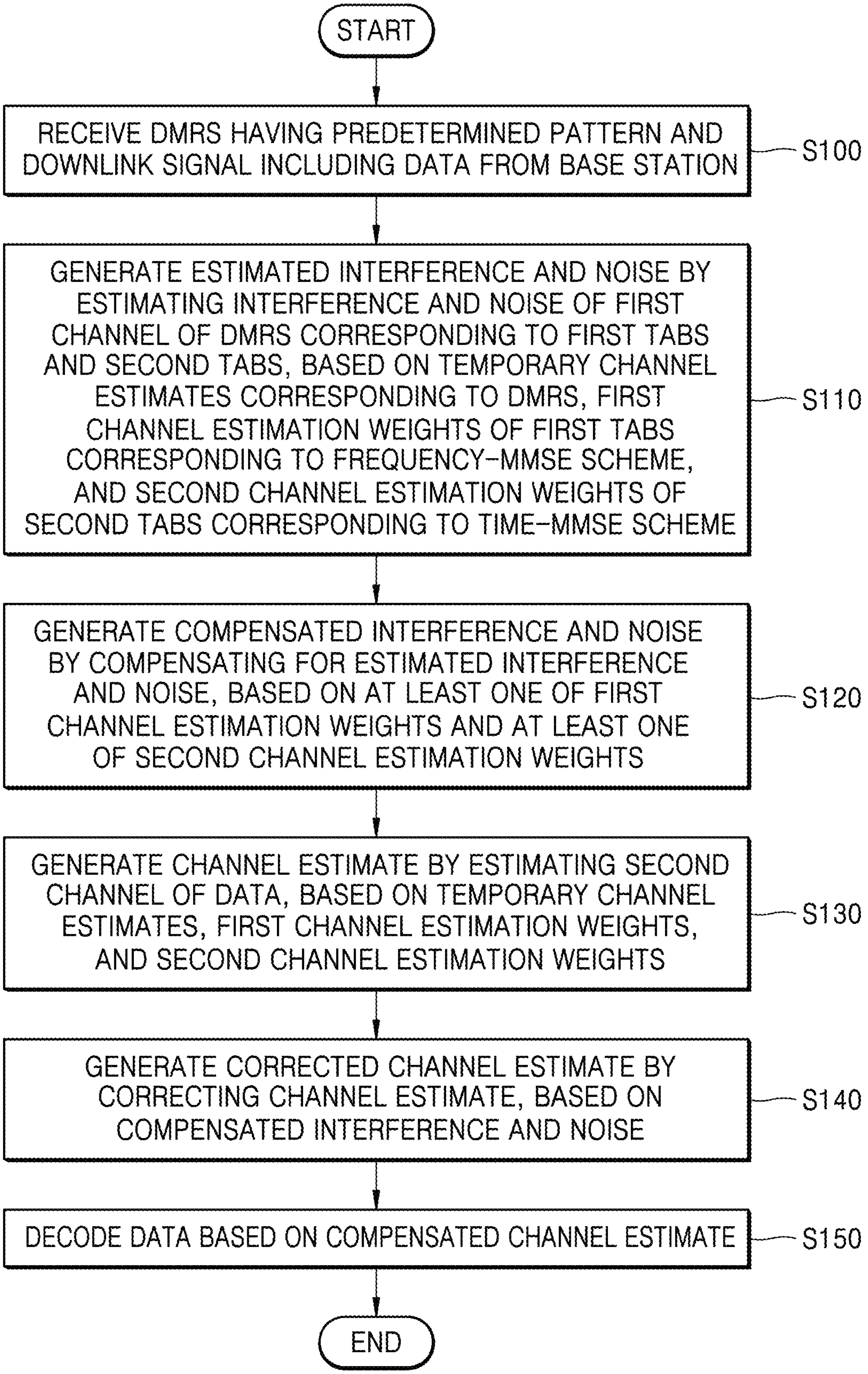
FIG. 8 is a flowchart of an operating method of a user equipment, according to an embodiment.

Referring to FIG. 8, in operation S115, a UE (refer to 100 in FIG. 1) may detect a communication environment between a base station and the UE. For example, the communication environment may be interpreted as including at least one of an SNR, a DSE and a DF. The UE 100 may estimate at least one of an SNR, a DSE, and a DF, based on a signal received from the base station.

In operation S121, the UE 100 may generate compensated interference and noise by applying respectively different weights to at least one of first channel estimation weights and at least one of second channel estimation weights, based on the communication environment. For example, in a communication environment in which the DSE is estimated to be relatively high, the UE 100 may apply a smaller weight to the first channel estimation weight than a weight applied to the second channel estimation weight.

FIG. 8 is a flowchart of an operating method of a UE, according to an embodiment.

Descriptions of operation S100, operation S110, and operation S120 of FIG. 8 are the same as those given with reference to FIG. 6, and thus, detailed descriptions thereof are omitted. Hereinafter, operation S130, operation S140, and operation S150 are mainly described with reference to FIG. 8.

Referring to FIG. 8, in operation S130, a UE (refer to 100 in FIG. 1) may estimate a second channel of data, based on temporary channel estimates, first channel estimates, and second channel estimates, and generate a channel estimate. For example, referring to FIG. 5, the UE 100 may generate a channel estimate, based on temporary channel estimates corresponding respectively to REs RE_0 to RE_5 and first channel estimation weights of first tabs corresponding to data DATA. The UE 100 may generate the channel estimate on the additional basis of temporary channel estimates corresponding respectively to REs RE_2 and RE_6 and second channel estimation weights of second tabs corresponding to data DATA.

In operation S140, the UE 100 may correct the channel estimate, based on compensated interference and noise, and generate a corrected channel estimate. For example, referring to FIG. 3, the UE 100 may generate an interference filter, based on corrected interference and noise V'. The UE 100 may correct a channel estimate H_DATA, based on the interference filter, and generate a corrected channel estimate H'_DATA.

In operation S150, the UE 100 may decode data based on the corrected channel estimate H'_DATA. For example, referring to FIG. 3, the UE 100 may generate the interference filter based on the corrected interference and noise V'. The UE 100 may correct the data signal Y_DATA, based on the interference filter, and generate a corrected data signal Y'_DATA. The UE 100 may decode the corrected data signal Y'_DATA.

Although not shown in FIG. 8, as described above, the UE 100 may estimate an SNR or an SINR based on the compensated interference and noise V'. The UE 100 may improve the performance of various operations, based on the estimated SNR or the estimated SINR, by preventing or reducing distortion due to interference and noise.

Figure 9:
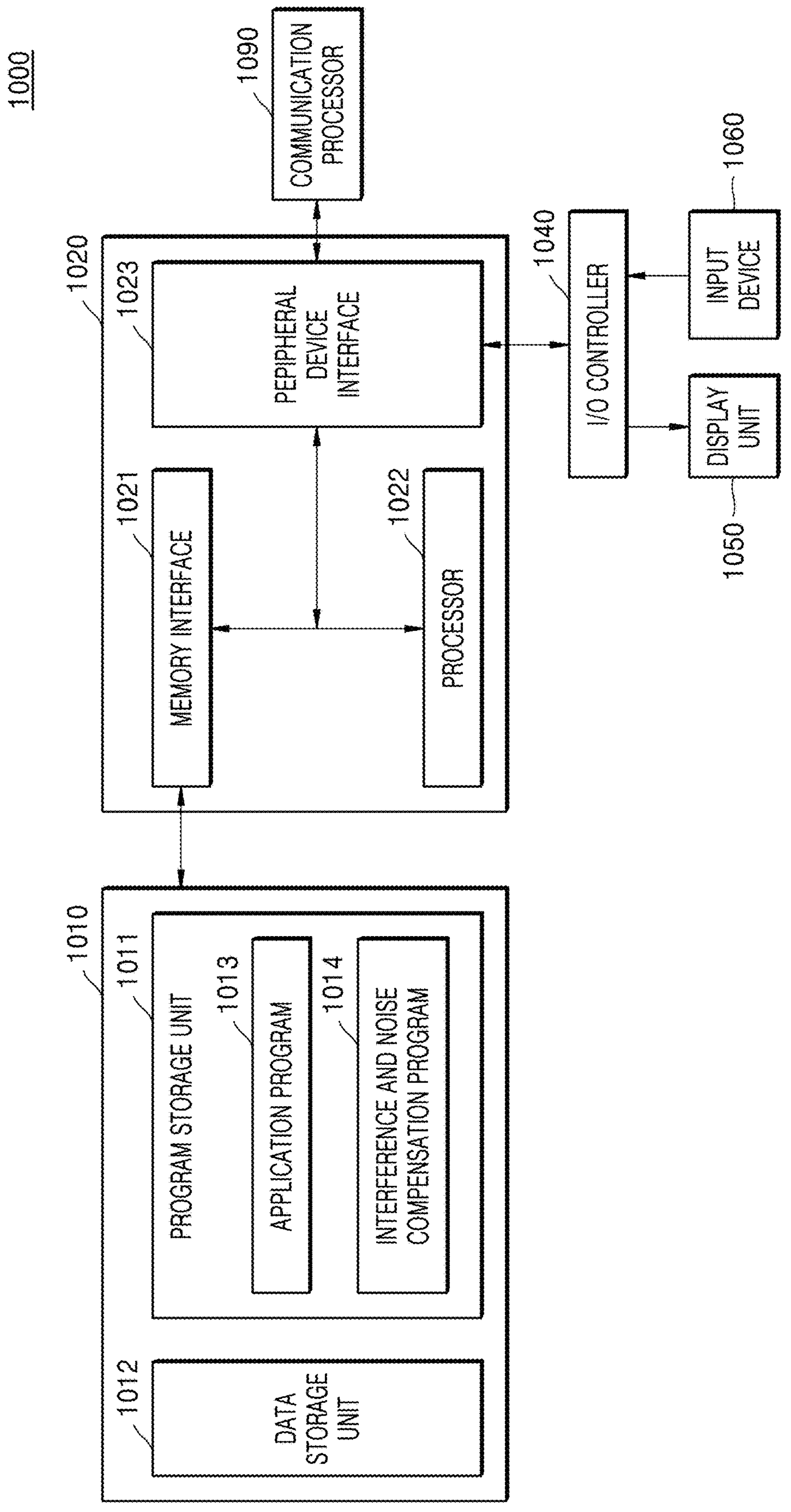
FIG. 9 is a block diagram of an electronic device according to an embodiment.

FIG. 9 is a block diagram of an electronic device 1000 according to an embodiment.

The electronic device 1000 of FIG. 9 may be a UE according to an embodiment.

Referring to FIG. 9, the electronic device 1000 may include a memory 1010, a processor unit 1020, an input/output (I/O) controller 1040, a display unit 1050, an input device 1060, and a communication processor 1090. Here, the memory 1010 may be provided in plural. Each of components of the electronic device 1000 are now described.

The memory 1010 may include a program storage unit 1011 configured to store a program for controlling an operation of the electronic device 1000 and a data storage unit 1012 configured to store data generated during the execution of the program. The data storage unit 1012 may store data required for operations of an application program 1013 and an interference and noise compensation program 1014 or store data generated due to the operation of the application program 1013. For example, the data storage unit 1012 may store an SNR or SINR, which is estimated by a processor 1022. The data storage unit 1012 may transmit the estimated SNR or the estimated SINR to the processor unit 1020 to determine the channel estimation weight described above.

The program storage unit 1011 may include the application program 1013. Here, the program included in the program storage unit 1011 may be a set of instructions and may be expressed as an instruction set. The application program 1013 may include pieces of program code for performing various applications that operate in the electronic device 1000. That is, the application program 1013 may include pieces of code (or commands) related to various applications run by the processor 1022.

Moreover, the electronic device 1000 may include the communication processor 1090 configured to perform a communication function for voice communication and data communication. A peripheral device interface 1023 may control connection among the I/O controller 1040, the communication processor 1090, the processor 1022, and a memory interface 1021. The processor 1022 may control a plurality of base stations to provide the services corresponding thereto by using at least one software program. In this case, the processor 1022 may execute at least one program stored in the memory 1010 and provide services corresponding to the at least one program.

The I/O controller 1040 may provide an interface between an I/O device, such as the display unit 1050 and the input device 1060, and the peripheral device interface 1023. The display unit 1050 may display status information, input text, moving pictures, and still pictures. For example, the display unit 1050 may display application program information driven by the processor 1022.

The input device 1060 may provide input data generated by selection of the electronic device 1000 to the processor unit 1020 through the I/O controller 1040. In this case, the input device 1060 may include a keypad including at least one hardware button and a touch pad configured to detect touch information. For example, the input device 1060 may provide touch information, such as touch, touch movement, and touch release that are detected via the touch pad, to the processor 1022 through the I/O controller 1040.

Figure 10:
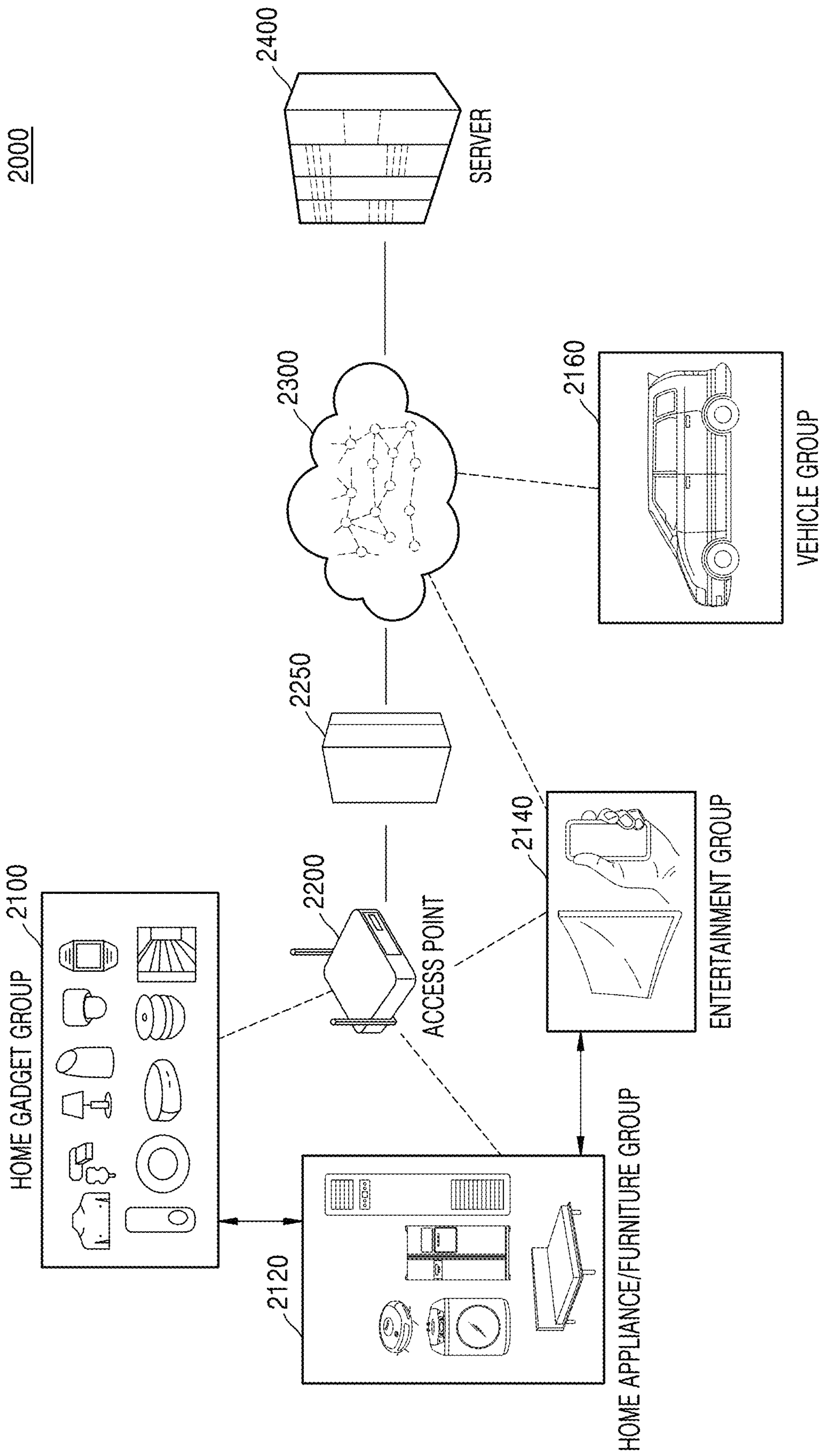
FIG. 10 is a conceptual diagram of an Internet of Things (IoT) network system according to an embodiment.

FIG. 10 is a conceptual diagram of an Internet of Things (IoT) network system 2000 according to an embodiment.

Referring to FIG. 10, the IoT network system 2000 may include a plurality of IoT devices (e.g., 2100, 2120, 2140, and 2160), an AP 2200, a gateway 2250, a wireless network 2300, and a server 2400. An IoT may refer to a network between things using wired/wireless communication.

Each of the IoT devices (e.g., 2100, 2120, 2140, and 2160) may form a group according to the characteristics thereof. For example, the IoT devices may be grouped into a home gadget group 2100, a home appliance/furniture group 2120, an entertainment group 2140, or a vehicle group 2160. The plurality of IoT devices (e.g., 2100, 2120, and 2140) may be connected to a communication network or another IoT device through the AP 2200. The AP 2200 may be embedded in one IoT device. The gateway 2250 may change a protocol such that the AP 2200 is connected to an external wireless network. The IoT devices (e.g., 2100, 2120, and 2140) may be connected to an external communication network through the gateway 2250. The wireless network 2300 may include the Internet and/or a public network. The plurality of IoT devices (e.g., 2100, 2120, 2140, and 2160) may be connected to the server 2400, which provides a predetermined service, through the wireless network 2300, and a user may use the service through at least one of the plurality of IoT devices (e.g., 2100, 2120, 2140, and 2160).

According to embodiments, the plurality of IoT devices (e.g., 2100, 2120, 2140, and 2160) may compensate for interference and noise of a communication channel. The plurality of IoT devices (e.g., 2100, 2120, 2140, and 2160) may improve the performance of various operations based on an estimated SNR or estimated SINR, by compensating for interference and noise.

Various changes in form and details may be made therein without departing from the spirit and scope of the following claims.

What is claimed is:

1. A user equipment comprising:

a transceiver configured to receive a demodulation reference signal (DMRS) having a predetermined pattern, and a first downlink signal comprising data, from a base station; and a processor configured to generate an estimated interference and noise by estimating interference and noise of a first channel using the DMRS and using a first minimum mean square error (MMSE) scheme, based on temporary channel estimates corresponding to the DMRS and first channel estimation weights corresponding to the first MMSE scheme, and generate compensated interference and noise by compensating for the estimated interference and noise, based on at least one of the first channel estimation weights.

2. The user equipment of claim 1, wherein the processor is configured to generate the compensated interference and noise, based on a first channel estimation weight having a greatest value among the first channel estimation weights.

3. The user equipment of claim 1, wherein the processor is configured to generate the compensated interference and noise, based on a combination of at least two of the first channel estimation weights.

4. The user equipment of claim 1, wherein the processor is configured to generate a channel estimate by estimating a second channel of the data, based on the temporary channel estimates and first channel estimation weights of the first MMSE scheme corresponding to the data, and generate a corrected channel estimate by correcting the channel estimate, based on the compensated interference and noise.

5. The user equipment of claim 4, wherein the processor is configured to decode the data based on the corrected channel estimate.

6. The user equipment of claim 1, further comprising a memory configured to store an adjustment coefficient corresponding to a signal to noise ratio (SNR) measured from a second downlink signal received before the first downlink signal, wherein the processor is configured to generate the compensated interference and noise on additional basis of the adjustment coefficient.

7. The user equipment of claim 6, wherein the adjustment coefficient is proportional to the SNR.

8. The user equipment of claim 6, wherein the adjustment coefficient is inversely proportional to the SNR.

9. The user equipment of claim 1, wherein the first MMSE scheme comprises a frequency-MMSE scheme.

10. The user equipment of claim 9, wherein the processor is further configured to generate a second estimated interference of the first channel based on second channel estimation weights corresponding to a time-MMSE scheme, and generate the compensated interference and noise on additional basis of at least one of the second channel estimation weights.

11. The user equipment of claim 10, wherein the processor is configured to generate the compensated interference and noise on additional basis of a second channel estimation weight having a greatest value among the second channel estimation weights.

12. The user equipment of claim 1, wherein the estimated interference and noise are less than the compensated interference and noise.

13. A method of a user equipment, the method comprising:

receiving a demodulation reference signal (DMRS) having a predetermined pattern, and a downlink signal comprising data, from a base station;

generating an estimated interference and noise by estimating interference and noise of a first channel using the DMRS and using a frequency-minimum mean square error (MMSE) scheme and a time-MMSE scheme, based on temporary channel estimates corresponding to the DMRS, first channel estimation weights corresponding to the frequency-MMSE scheme, and second channel estimation weights corresponding to the time-MMSE scheme; and generating compensated interference and noise by compensating for the estimated interference and noise, based on at least one of the first channel estimation weights and at least one of the second channel estimation weights.

14. The method of claim 13, wherein the generating of the compensated interference and noise is performed based on a first channel estimation weight and a second channel estimation weight, which correspond to the first channel.

15. The method of claim 13, wherein the estimated interference and noise are less than the compensated interference and noise.

16. The method of claim 13, further comprising detecting a communication environment between the base station and the user equipment, wherein the generating of the compensated interference and noise is performed by applying respectively different weights to at least one of the first channel estimation weights and at least one of the second channel estimation weights.

17. The method of claim 13, further comprising:

generating a channel estimate by estimating a second channel of the data, based on the temporary channel estimates, the first channel estimation weights, and the second channel estimation weights; and generating a corrected channel estimate by correcting the channel estimate, based on the compensated interference and noise.

18. The method of claim 13, further comprising decoding the data based on the corrected channel estimate.

19. The method of claim 13, further comprising a communication environment between the base station and the user equipment, wherein the generating of the compensated interference and noise is performed by applying respectively different weights to at least one of the first channel estimation weights and at least one of the second channel estimation weights, based on the communication environment.

20. A user equipment comprising:

a transceiver configured to receive a demodulation reference signal (DMRS) having a predetermined pattern, and a downlink signal comprising data, from a base station; and a processor configured to generate an estimate of a first channel by estimating the first channel using the DMRS and using a frequency-minimum mean square error (MMSE) scheme and a time-MMSE scheme, based on temporary channel estimates corresponding to the DMRS, first channel estimation weights corresponding to the frequency-MMSE scheme, and second channel estimation weights corresponding to the time-MMSE scheme, generate estimated interference and noise by estimating interference and noise corresponding to the first channel, based on the estimate of the first channel, and generate compensated interference and noise by compensating for the estimated interference and noise, based on at least one of the first channel estimation weights and at least one of the second channel estimation weights, wherein the compensated interference and noise are greater than the estimated interference and noise.

* * * * *